United States Patent [19]

Fecher et al.

[11] Patent Number: 4,970,939
[45] Date of Patent: Nov. 20, 1990

[54] PLUNGER FOR A CONTROL VALVE OF A SERVOMOTOR

[75] Inventors: Douglas A. Fecher, Granger; David C. Yoder, South Bend, both of Ind.

[73] Assignee: Allied-Signal Inc., Morristown, N.J.

[21] Appl. No.: 401,325

[22] Filed: Aug. 31, 1989

[51] Int. Cl.⁵ ............................................. F15B 9/10
[52] U.S. Cl. ................... 91/369.1; 91/376 R
[58] Field of Search ............... 91/369.1, 369.2, 369.3, 91/376 R

[56] References Cited

U.S. PATENT DOCUMENTS 3,727,516  4/1973  Myers et al. .................. 91/376 R
4,022,112  5/1977  Putt et al. ...................... 91/369.2
4,450,688  5/1984  Boehm .......................... 91/369.2

Primary Examiner—Allen M. Ostrager
Attorney, Agent, or Firm—Leo H. McCormick, Jr.; Ken C. Decker

[57] ABSTRACT

A plunger (52) having a cylindrical body with a smooth surface (61) thereon which joins an semi-spherical atmospheric seat (62) with a conical surface (60) to define with a section (31) of bore (30) a flow path through which air is communicated from the environment to a rear chamber (20) without the creation of noise. The smooth surface (61) is made of a porous material (51) that absorbs sounds without substantially effecting the flow of air.

4 Claims, 2 Drawing Sheets

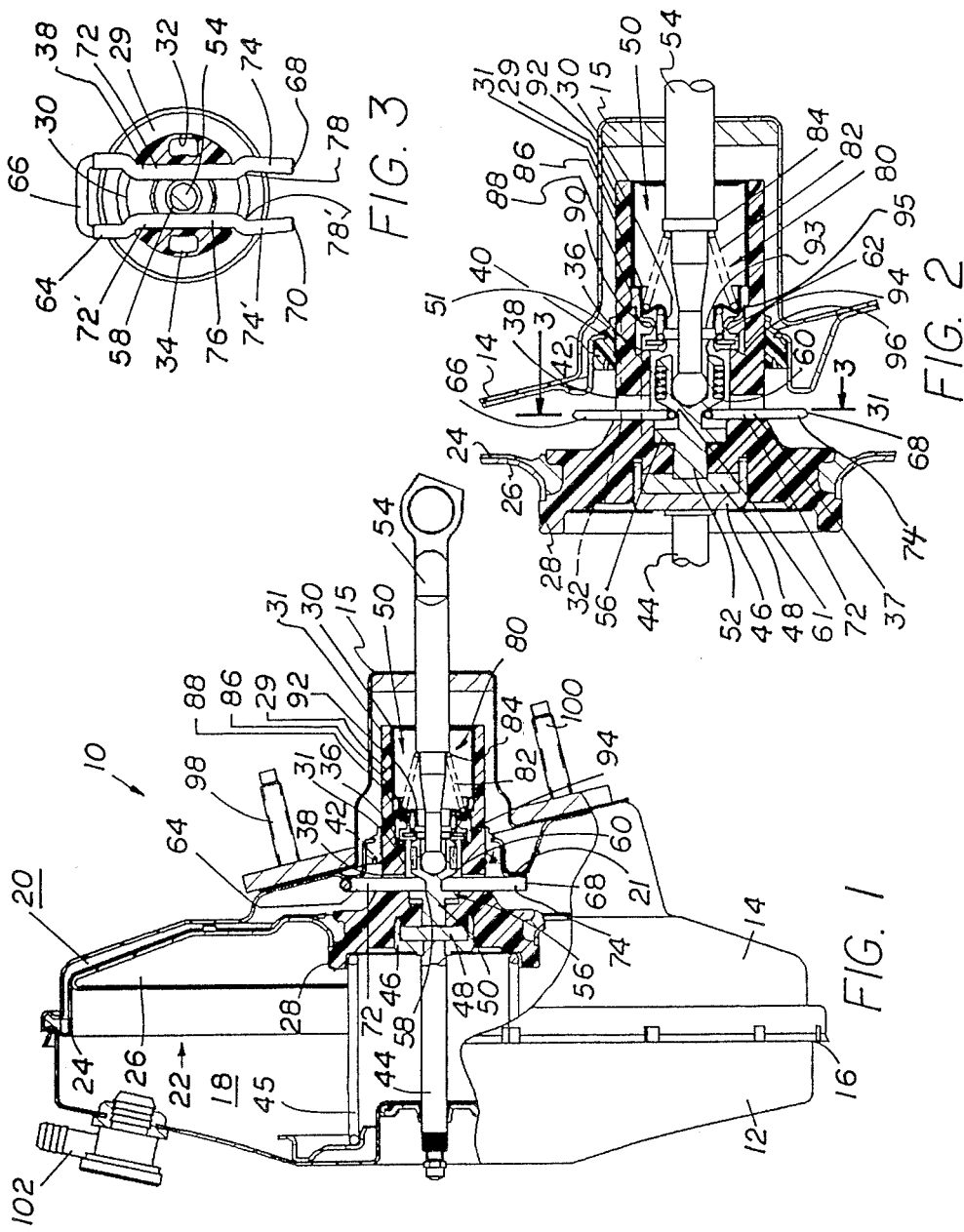

PLUNGER FOR A CONTROL VALVE OF A SERVOMOTOR

This invention related to a plunger for a control valve in a hub located in a movable wall of a servomotor. The plunger has a contoured surface that extends from an annular atmospheric seat to a conical surface to substantially reduce turbulence in the flow of air presented to a rear chamber to develop a pressure differential across the wall to produce an output for the servomotor.

In early servomotors operated through the creation of a pressure differential such as disclosed in U.S. Pat. No. 3,125,003, it was common practice to retain the plunger of the control valve in a hub by a pin held in place by a bead on the diaphragm which formed part of the movable wall. Later the pin was replaced by a stop member such as disclosed in U.S. Pat. Nos. 3,688,647; 4,619,185; 4,729,284; and 4,787,292 which included either clips or arms that surround the hub to lock the stop member in place and retain the valve in the hub. In all of these control valves, the plunger is made of a cylindrical member having a groove section to reduce the weight of the plunger and allow for a staking operation to attach a push rod to the plunger. This type control valve performed in a satisfactory manner however some noise could be introduced during certain applications. U.S. Pat. No. 3,727,516 discloses the addition of a resilient disc located on the end of the plunger to cushion the impact as the plunger which could contact the bottom of the bore during maximum travel in response to an input force.

Later, it was discovered that the travel required to operate a plunger in a control valve for a pressure differential servomotor could be reduced by locating the plunger in a ready position after the equalization of the fluid pressure in the operation chambers as shown in U.S. Pat. Nos. 4,487,105 and 4,562,696. Unfortunately these stop members make a clicking noise when engaging the housing to establish the rest position for the control valve. In copending U.S. Patent Application Ser. No. 392,876 filed Aug. 14, 1989, the clicking noise was eliminated by the introduction of a retention key with a resilient coating which absorbs noise. Further the actuation time for the control valve was further reduced by locating the plunger in the lap or isolated and ready position when the movable wall is in its rest position. In order to so position the plunger, a key member located in a slot in the hub has a base section with legs that extend therefrom. The legs have an arcuate section that surround a plunger and end section The plunger has a cylindrical body with an atmospheric seat that engages a face on a poppet member and a groove adjacent a first flange that forms a bearing surface that slides in the bore of the hub. The flange contacts the arcuate surface of the key member and moves the key member in the slot in the hub to establish a full release position. In the release, the atmospheric seat engages the face on the poppet member and correspondingly moves the face from a vacuum seat to allow free and unrestricted communication between the front and rear chambers whereby the pressure differential is rapidly dissipated as the pressures therein equalize. As a return spring moves the movable wall toward the rear chamber, the base member and end sections of the legs of the key member engage the rear shell to hold the plunger stationary while the hub and movable wall continue to move toward the rear shell. When the movable wall engages the rear shell, the face of the poppet member is again seated on both the atmospheric seat on the cylindrical body of the plunger and the vacuum seat on the hub to isolate the front chamber from the rear chamber. Thus, when an input force is again applied to move the plunger, air is immediately communicated to the rear chamber and the development of the pressure differential immediately commences.

Since the key member is coated with a resilient material any sound or noise associated by its movement in the slot and the engagement with flange on the cylindrical body is attenuated. In addition, a second flange on the cylindrical body engages the arcuate section as the plunger is moved toward its maximum stroke by the input force to cushion any noise that may be caused by the engagement of a first flange on the plunger with the hub. With the plunger in the ready position, upon the application of an actuation force moving the plunger and the presentation of air to the rear chamber, noise can be created as air rapidly flows through the bore around the groove and surface of the plunger In the present invention, a plunger for a control valve is located in a hub in a wall that separates a front chamber from a rear chamber in a servomotor. The plunger has a rest or ready position where a face on a poppet member simultaneously engages an atmospheric seat on the plunger and a vacuum seat on the hub. The plunger has a release position where the face of the poppet member is moved away from the vacuum seat to allow vacuum present in the front chamber to evacuate air from the rear chamber to equalize the fluid pressure between the front and rear chambers. The plunger has an actuation position where the atmospheric seat is moved away from the face on the poppet by an input force to allow air to be communicated through the bore to the rear chamber and create a pressure differential through which an output force develops corresponding to the input force. The plunger is characterized by a smooth contoured surface that directs air into radial passages in the hub without the development of turbulence which may create noise. The smooth contoured surface is created in part by a ring of a porous material which surrounds the cylindrical body of the plunger to define a smooth surface from the atmospheric seat to the retention groove for the key member. Further, the porous material absorbs noise as the air flows through the hub to passages for presentation to the second or rear chamber.

It is an object of the present invention to provide a servomotor operated by a pressure differential with a plunger for a control valve to reduce the creation of noise that occurs when air is presented to a rear chamber during a brake application.

It is a further object of the present invention to provide a control valve with a plunger that has a smooth contoured surface that attenuates the created of noise when operational fluid is presented to a rear chamber.

An advantage of this invention occurs in the quite operation of a control valve during a brake application.

These objects and advantages should be apparent from reading this specification while viewing the drawings, in which:

FIG. 1 is a schematic illustration of a brake booster with a control valve having a plunger made in accordance with the principles of this invention;

FIG. 2 is an enlarged sectional view of the plunger for the control valve in FIG. 1 showing the flow path for air to the rear chamber in response to an input force moving the plunger to a fully actuated position;

FIG. 3 is a sectional view taken along line 3—3 of FIG. 2 showing the key member, hub and plunger.

Figure 4:
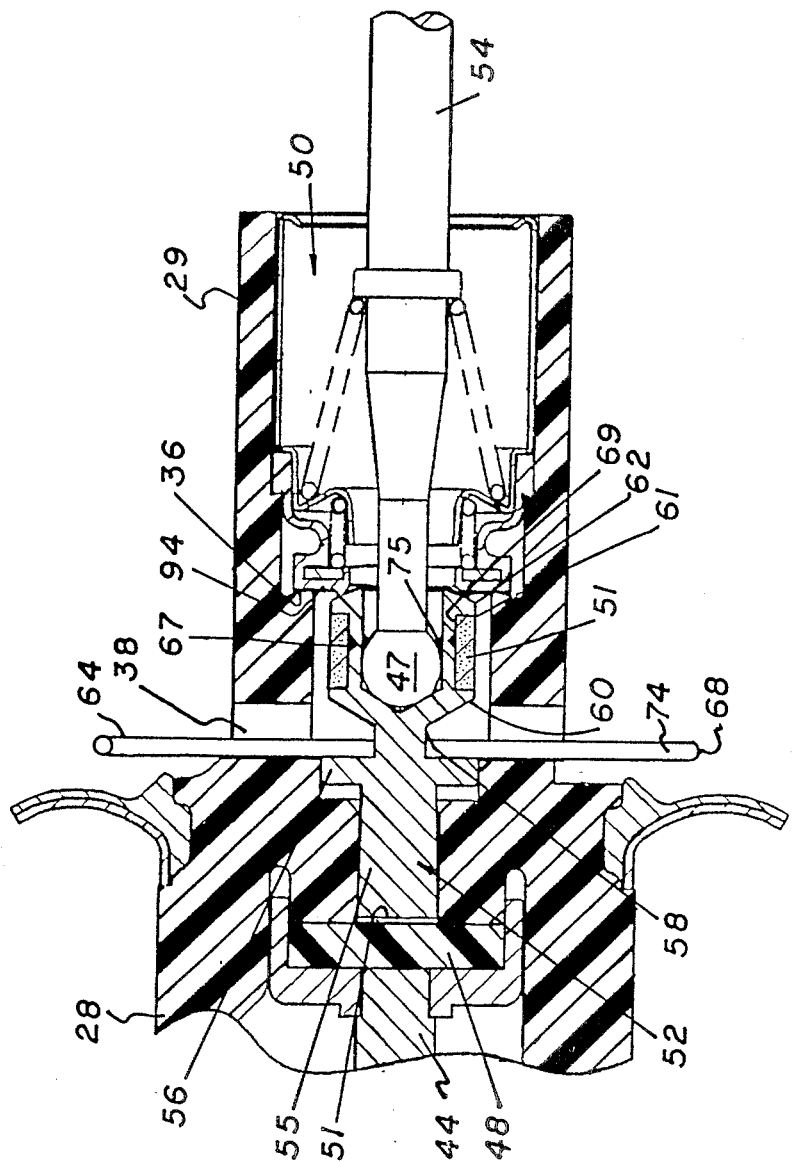
FIG. 4 is a further still further enlargement of the control valve for the servomotor of FIG. 1.

The servomotor 10 shown in FIG. 1 is designed to be connected to a master cylinder in a brake system to assist in providing the input force required to operate the master cylinder and effect a brake application. The servomotor 10 is designed to be quite, efficient and provide an immediate input force to operate the master cylinder in response to an operator input.

The servomotor 10 has a front shell 12 joined to a rear shell 14 by a series of lances and tabs 16 to form a closed housing. The interior of the closed housing is divided into a front chamber 18 and a rear chamber 20 by a movable wall 22. The movable wall 20 includes a diaphragm 24, backing plate 26 and a hub 28. Hub 28 has a cylindrical body 29 with a stepped bore 30 that extends therethrough, a plurality of passages 32 and 34 as best shown in FIG. 3, that extend to an annular vacuum seat 36, and a radial slot 38. The cylindrical body 29 extends through an opening 40 in the rear shell 14 into the surrounding environment. A seal 42 of the type disclosed in U.S. Patent Application Ser. No. 238,950 filed Aug. 31, 1988 and now U.S. Pat. No. 4,898,081 is located between opening 40 and the exterior surface 31 on the cylindrical projection 29 to seal chamber 20 from the surrounding environment.

An output push rod 44 has a head 46 that encloses reaction disc 48 located in the stepped bore 30 to provide a piston in the master cylinder with an input force during a brake application.

A control valve 50 as best shown in FIGS. 2 and 4, is located in bore 30 and has a plunger 52 connected to an input push rod 54 attached to a brake pedal. Plunger 52 has a cylindrical body with a first end 53 and a second end 63. The cylindrical body has a first diameter surface 55 that extends from the first end 53 to a second diameter surface 56. The first and second diameter surfaces 55 and 56 engages bore 30 to establish a bearing surface for plunger 52 to maintain atmospheric seat 62 in substantial axial alignment in bore 30. Plunger 52 has a third diameter surface formed by groove 58 which is connected to a fourth diameter surface 61 by a conical surface 60. A semi-spherical surface connects the fourth diameter surface 61 to the second end 63. The semi-spherical surface forms the atmospheric seat 62 on the plunger 52. A groove 59 located between the semi-spherical surface 62 and the conical surface 60 has a series of indentations 57 caused by a staking operation that produces projections 75 that hold push rod ball 47 on plunger 52. In order to reduce turbulence in the flow of fluid under pressure around the plunger 52, a light weight porous material material 51, which in the present instance is a polyethylene-foam, which is placed in groove 59 to form a flat annular surface from the end of the semi-spherical surface 62 to the beginning of the conical surface 60 on the plunger 52 to form a smooth surface.

A key member as best shown in FIG. 3 has a base member 66 with legs 68 and 70 that extend therefrom. Each leg 68 and 70 has an arcuate section 72, 72' and an end section 74, 74'. The key member 64 is made of a cylindrical wire that is bent into the shape shown in FIG. 3. A rubber or plastic coating 76 is either placed on the key member 64 by dipping or by placing a piece of heat responsive tubing over the wire 64 and setting the tubing by the application of heat or molding a coating around the key member 64. Thereafter, the key member 64 is inserted in slot 38 to hold plunger 50 in bore 30.

During the insertion, ends 68 and 70 are pinched together until tangents 78, 78' engage groove 58 on plunger 50 expand as the arcuate section 72, 72' move into the cylindrical body 29 and later expand to lock the key member 64 in the cylindrical body 29 as shown in FIG. 3.

Prior to the insertion of the plunger 50 into bore 30, poppet valve 80 is attached to the push rod 54. Poppet valve 80 includes return spring 82 which has first end located on shoulder 84 of the push rod 54 and a second that engages retainer 86. A bead 88 on the end of the flexible section 90 surrounds the retainer 86 and a valve spring 92 urges valve face 94 on disc 93 away from the retainer 86. On insertion of the plunger 50 into bore 30, retainer 86 holds bead 88 against shoulder 95 such that in the rest position face 94 is seated on atmospheric seat 62 to define the limits for passages 32 and 34 within bore 30.

The servomotor 10 is installed in a vehicle through mounting bolts 98 and 100 and push rod 54 attached to the brake pedal. Check valve 102 in the front shell 12 is connected to the intake manifold of the vehicle. When the vehicle is operating, vacuum present at the intake manifold evacuates air from chamber 18. An evacuation pressure differential acts on plunger 52 to move face 94 away from vacuum seat 36 to allow any air present in chamber 20 to be evacuated into chamber 18 via bore section 31 and slot 38 and equalize the pressure in chambers 18 and 20. When the pressure in chambers 18 and 20 equalized valve spring 92 again seats face 94 on vacuum seat 36 to isolate chamber 20 from chamber 18. In response to an input force applied to push rod 54, plunger 52 moves atmospheric seat 62 away from face 94 to allow air to flow through filter 15 into bore 30 along a flow path whose entrance is defined by the semi-spherical surface of seat 62, the annular space between bore surface 31 and smooth surface 61 to the conical surface 60 before exiting from bore surface 31 through passages or slot 38 into chamber 20.

Since atmospheric seat 62 immediately moves away from face 94, air is immediately presented to rear chamber 20. With air in rear chamber 20 and vacuum in front chamber 18, a pressure differential is created across wall 22. The pressure differential acts on wall 22 to produce an output force which is transferred into hub 28 and through reaction disc 48 to push rod 44. The output force overcomes return spring 45 to supply the master cylinder with an actuation force corresponding to the input force applied to push rod 54. On termination of the input force on push rod 54, return spring 82 moves plunger 50 toward disc 93 to bring atmospheric seat 62 into engagement with face 94 to terminate the flow communication of air through bore 30. At this time flange 56 engages arcuate segments 72, 72' on key member 64 to move key member 64 into engagement with the bottom 39 of slot 38 to define a full release position whereby air is now evacuated from chamber 20 to chamber 18, via slot 38, bore section 31 and passages 32 and 34, to equalize the pressure therebetween.

As wall 22 approaches the rear shell 14, the base section 66 and end members 74, 74' of the key member 64 engages stop 21 on the rear shell 14 to hold plunger 50 stationary as the hub 28 and wall 22 continues to move toward the rear shell 14 by the force of the return spring 45. The size of the plurality of openings 32 and 34 and the slot 38 is such that the fluid pressure in chambers 20 and 18 is substantially identical when the key member 64 engages stop 21. As the hub 28 continued to move toward the rear shell 14, key member 64 moves in slot 38 such that when wall 22 reaches its rest position, arcuate sections 72, 72' engage the top 37 of slot 38. With the key member 64 positioned at the top 37 of the slot 38, valve spring 92 seats face 94 on vacuum seat 36 to inhibit fluid communication between chambers 18 and 20. Thus, the plunger 52 is in the ready position with groove 58 aligned with passages or slot 38 and atmospheric seat 62 on face. Thereafter on push rod 54 receiving an input force, atmospheric seat 62 immediately moves away from face 94 to allow air to immediately flow to the rear chamber 20 on movement of the plunger 50 by an input force.

Since the porous material 51 has a smooth surface that extends from the end of the semi-spherical seat 62 to the conical surface 60 and the porous material 51 absorbs sounds, noise created through the flow of air to the rear chamber 20 is substantially eliminated in this servomotor 10. In addition, under some circumstances when the input force applied to the brake pedal is rapid and the control valve 50 is moved to a full actuation position as shown in FIG. 3 the resilient coating on key member 64 also absorbs noise by conical surface 60 engaging arcuate surfaces 72, 72' on key member 64 to cushion the input force and attenuate any noise that may be produced by this type of application.

We claim:

1. A plunger for a control valve located in a bore of a hub in a wall that separates a front chamber from a rear chamber in a servomotor, said plunger having a rest position where a face on a poppet member simultaneously engages an atmospheric seat on the plunger and a vacuum seat on said hub, a release position where the face is moved away from the vacuum seat to allow vacuum present in the front chamber to evacuate air from the rear chamber and equalize the fluid pressure between the front and rear chambers and an actuation position where the atmospheric seat is moved away from the face by an input force to allow air to be communicated through the hub to the rear chamber and create a pressure differential between the front chamber and rear chamber in response to an input force, said pressure differential developing a force across the wall to produce an output force for the servomotor, said plunger being characterized by a cylindrical body with a first end and a second end, said cylindrical body having a first diameter surface extending from said first end to a second diameter surface, said first and second diameter surfaces engaging the hub to maintain the atmospheric seat in axial alignment within the hub, said cylindrical body having a third diameter surface connected to a fourth diameter surface by a conical surface and a semi-spherical surface that connects said fourth diameter surface to said second end, said third diameter surface being in substantial radial alignment with passages through said hub when said plunger is in the rest position, said fourth diameter surface and bore defining an annular flow path in the hub for communicating air to said rear chamber, said semi-spherical surface forming an entrance to said annular flow path and said conical surface forming an exit for said annular flow path such that air turbulence is substantially eliminated as the air flows over a smooth contoured surface without turbulence to attenuate the creation of noise as air flows through the hub to the rear chamber.

2. The plunger as recited in claim 1 wherein said cylindrical body is further characterized by a groove located between said conical surface and semi-spherical surface, said groove having a series of indentations adjacent a series of inward projections that engage and hold a member through which said input force is applied to said cylindrical body.

3. The plunger as recited in claim 2 wherein said cylindrical body is further characterized by a band of porous material located in said groove, said porous material having a peripheral surface that joins the fourth surface to said conical surface.

4. The plunger as recited in claim 3 wherein said porous material is characterized by a foam material that absorbs sounds without adding to the weight of the plunger.

* * * * *